United States Patent
Shah

(10) Patent No.: US 6,738,818 B1
(45) Date of Patent: May 18, 2004

(54) CENTRALIZED TECHNIQUE FOR ASSIGNING I/O CONTROLLERS TO HOSTS IN A CLUSTER

(75) Inventor: Rajesh R. Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,445

(22) Filed: Dec. 27, 1999

(51) Int. Cl.$^7$ .................. G06F 15/16; G06F 15/177; G06F 3/00

(52) U.S. Cl. ............... 709/228; 709/222; 709/250; 710/8; 710/9; 710/10; 710/36; 710/37; 710/38

(58) Field of Search .................. 709/220–229, 709/203; 710/1–74

(56) References Cited

U.S. PATENT DOCUMENTS

| | | | | |
|---|---|---|---|---|
| 4,403,286 A | * | 9/1983 | Fry et al. ................. | 709/105 |
| 4,455,605 A | * | 6/1984 | Cormier et al. ........... | 710/38 |
| 4,697,232 A | * | 9/1987 | Brunelle et al. .......... | 710/46 |
| 4,787,028 A | * | 11/1988 | Finfrock et al. .......... | 709/222 |
| 4,821,179 A | * | 4/1989 | Jensen et al. ............. | 710/38 |
| 5,297,262 A | * | 3/1994 | Cox et al. ................. | 710/36 |
| 5,371,852 A | * | 12/1994 | Attanasio et al. ......... | 709/245 |
| 5,530,897 A | * | 6/1996 | Meritt .................... | 710/9 |
| 5,787,306 A | * | 7/1998 | Michael .................. | 710/9 |
| 5,835,725 A | * | 11/1998 | Chiang et al. ............. | 709/228 |
| 5,881,284 A | * | 3/1999 | Kubo ...................... | 709/100 |
| 5,933,824 A | * | 8/1999 | DeKoning et al. ......... | 707/8 |
| 5,991,797 A | * | 11/1999 | Futral et al. .............. | 709/216 |
| 6,061,349 A | * | 5/2000 | Coile et al. ............... | 370/389 |
| 6,105,122 A | * | 8/2000 | Muller et al. ............. | 709/215 |
| 6,108,684 A | * | 8/2000 | DeKoning et al. ......... | 709/105 |
| 6,148,349 A | * | 11/2000 | Chow et al. .............. | 709/214 |
| 6,240,467 B1 | * | 5/2001 | Beardsley et al. ......... | 709/200 |
| 6,263,452 B1 | * | 7/2001 | Jewett et al. .............. | 714/9 |
| 6,308,239 B1 | * | 10/2001 | Osakada et al. ........... | 710/305 |
| 6,424,992 B2 | * | 7/2002 | Devarakonda et al. ...... | 709/203 |
| 6,496,880 B1 | * | 12/2002 | Ma et al. .................. | 709/208 |
| 6,519,645 B2 | * | 2/2003 | Markos et al. ............. | 709/228 |
| 6,587,950 B1 | * | 7/2003 | Shah et al. ................ | 713/300 |
| 6,591,309 B1 | * | 7/2003 | Shah ........................ | 710/2 |

FOREIGN PATENT DOCUMENTS

WO    Wo98/28684    * 7/1998  ............ G06F/9/46

OTHER PUBLICATIONS

C. Attanasio and S. Smith, :A Virtual Multiprocessor Implemented by an Encapsulated Cluster of Loosely Coupled Computers, IBM research Report RC188442, 1992.□□.*

Zhang, Xiaolan; Chen, Bradley; and Seltzer, Margo,: "HACC: An Architecture for Cluster–Based Web Servers", Division of Enineering and Applied Science, Harvard University, 1999.□□.*

* cited by examiner

Primary Examiner—Glenton B. Burgess
Assistant Examiner—Anita Choudhary
(74) Attorney, Agent, or Firm—Schwegman, Lundberg, Woessner & Kluth, P.A.

(57) ABSTRACT

A technique is provided for assigning an I/O controller to a host in a cluster. The cluster includes one or more hosts and one or more I/O controllers connected by a cluster interconnection fabric. In an example embodiment, an I/O controller is connected to the cluster interconnection fabric. The I/O controller connected to the fabric is detected and a network address is assigned to the I/O controller. An administrative agent is used to assign the I/O controller to a host that is connected to the cluster interconnection fabric. A message is sent to the host informing the host that the I/O controller is assigned to the host and providing the network address of the I/O controller.

19 Claims, 9 Drawing Sheets

EXAMPLE SOFTWARE DRIVER STACKS FOR COMPUTER
HAVING BUS-BASED I/O

EXAMPLE SOFTWARE DRIVER STACKS FOR COMPUTER HAVING
FABRIC-ATTACHED I/O

US 6,738,818 B1

CENTRALIZED TECHNIQUE FOR ASSIGNING I/O CONTROLLERS TO HOSTS IN A CLUSTER

FIELD

The invention generally relates to computers and more particularly to a technique for assigning I/O controllers to hosts in a cluster.

BACKGROUND

A cluster may include one or more hosts connected together by an interconnection fabric. In traditional clusters, hosts have locally attached I/O controllers connected to local buses. FIG. 1 illustrates a typical bus-based computer 100, which includes a processor 102 connected to a host bus 103 and an I/O and memory controller (or chipset) 104. A local I/O bus 105 is connected to an I/O bridge 108. Several I/O devices are attached to the I/O bus, including I/O controllers 110 and 112 and a Local Area Network (LAN) Network Interface Card (NIC) 114. The I/O controllers 110 and 112 may be connected to one or more I/O devices, such as storage devices, hard disk drives, or the like. I/O bus 105 is a traditional I/O bus, such as a Peripheral Component Interconnect (PCI bus) a Industry Standard Architecture (ISA) bus or Extended ISA (EISA) bus, etc. A traditional I/O bus provides attachment points to which I/O controllers can be attached.

A bus-based computer, such as that shown in FIG. 1, has a number disadvantages and drawbacks. All of the I/O controllers on the I/O bus share the same power and clock domain and share a common address space. Due to the physical and electrical load limitations, only a relatively small number of I/O controllers may be attached to an I/O bus, and must be physically located within the same cabinet. Thus, the entire I/O bus is physically attached to a single computer system. Also, in traditional clusters, I/O controllers are not directly connected to the network or cluster. Thus, the I/O controllers on the I/O bus of a computer system are directly visible (or detectable) and addressable only by that computer system or host, but are not directly visible or addressable to any other host in the cluster. For example, the I/O controllers 110 and 112 are visible only to computer 100, and are not visible or addressable to any other host which may be connected to LAN 120. Therefore, bus-based computer systems provide a very inflexible arrangement for I/O resources.

As a result, there is a need for a technique that provides a much more flexible arrangement for I/O devices for computer systems. In addition, under such a flexible arrangement of I/O resources, a mechanism should be provided that allows for the efficient and effective coordination and assignment between controllers and hosts.

SUMMARY

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein.

DETAILED DESCRIPTION

Network Architecture

Figure 1:
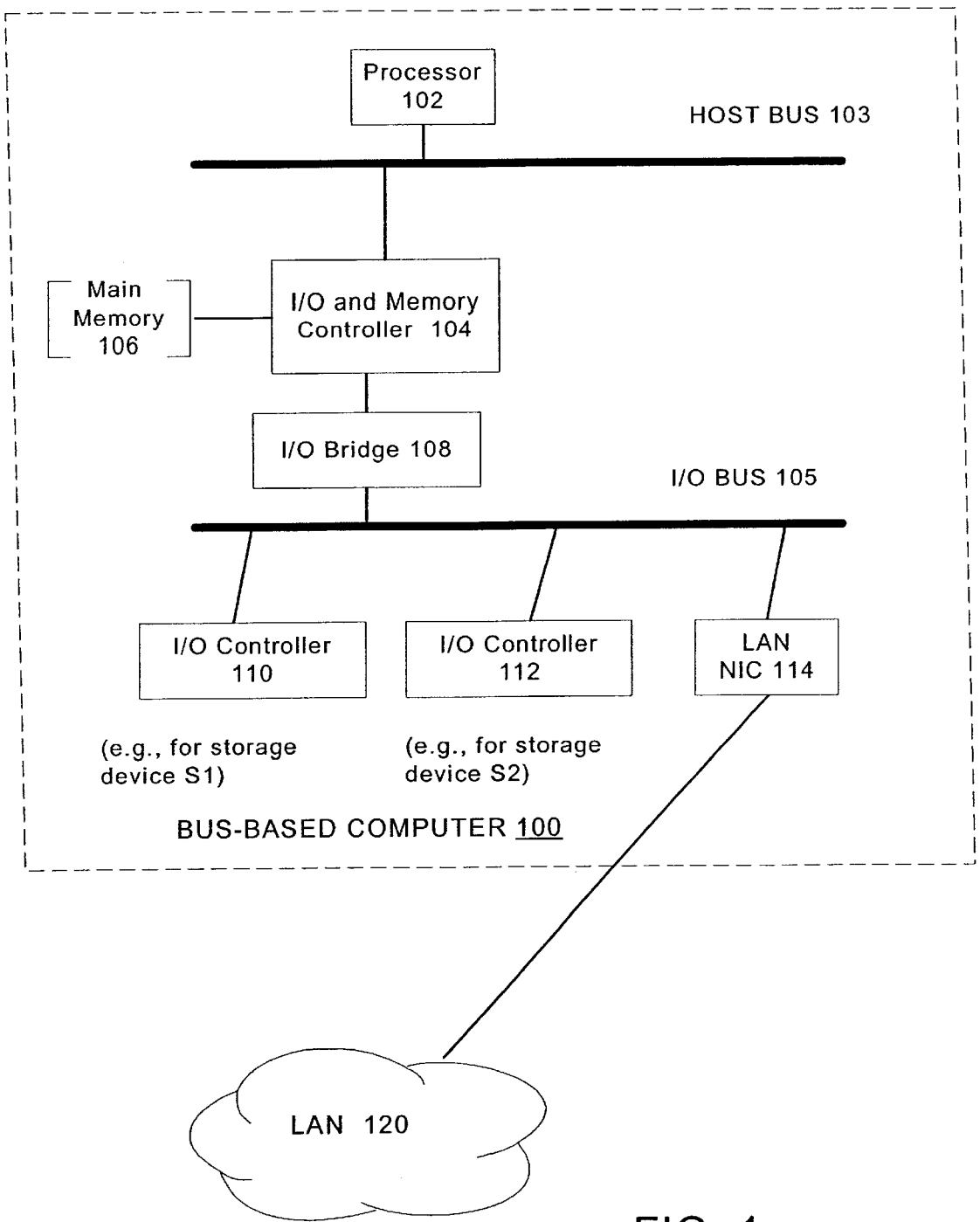
FIG. 1 is a block diagram illustrating a typical bus-based computer.
Figure 2:
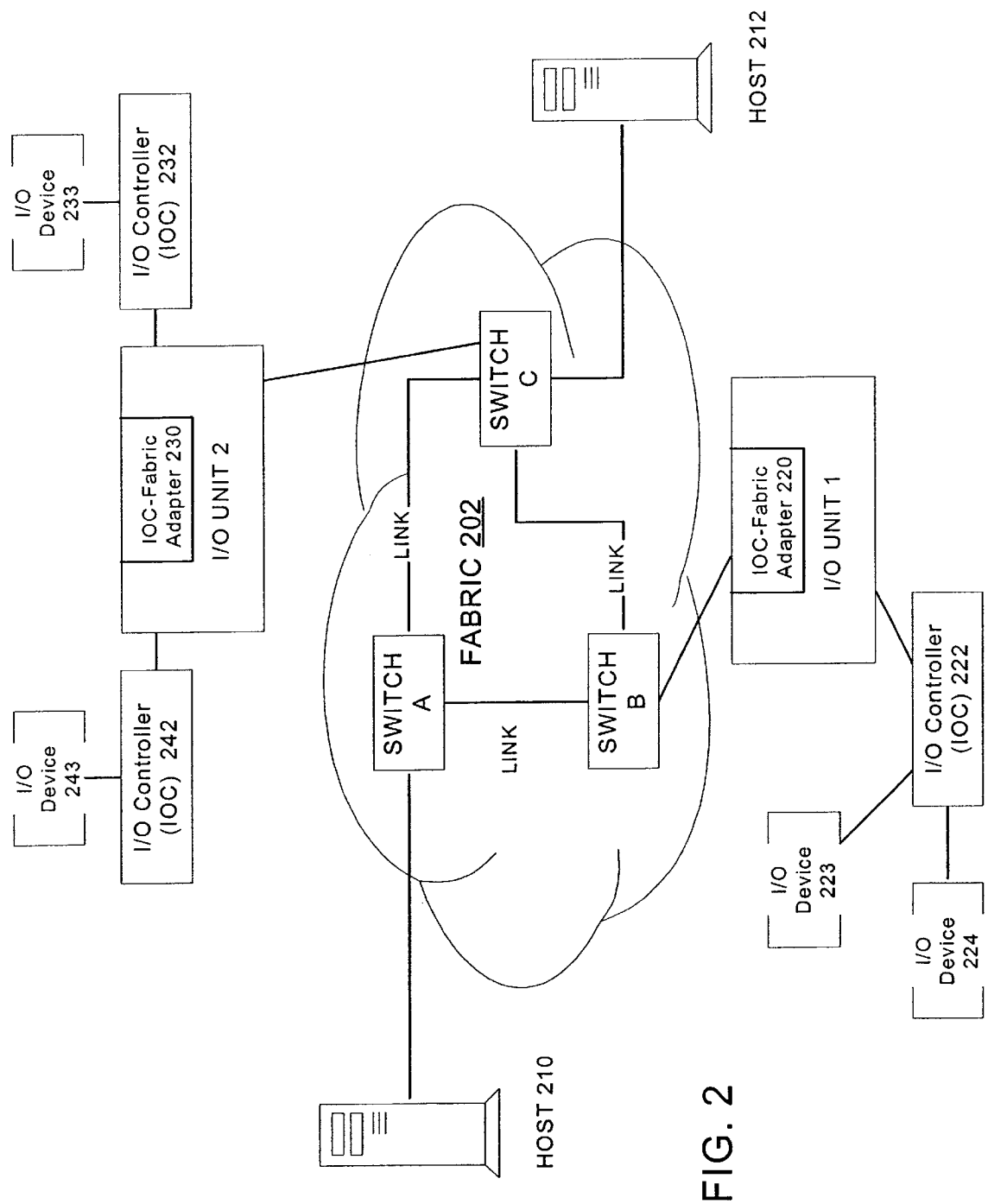
FIG. 2 is a block diagram illustrating an example network according to an embodiment of the present invention.

Referring to the figures in which like numerals indicate like elements, FIG. 2 is a block diagram illustrating an example network according to an embodiment of the present invention. A network is shown and may be a storage area network, a system area network or other type of network. The network includes several hosts, including host 210 and host 212, which may be personal computers, servers or other types of computers. A host generally is capable of running or executing one or more application-level (or user-level) programs. Also, a host is generally capable of initiating an I/O request (e.g., I/O reads or writes). Whereas, many I/O controllers or devices themselves do not typically run user-level programs and do not usually initiate I/O requests. Rather, I/O controllers and devices usually only perform some task or function in response to an I/O command or other request from a host.

The network includes one or more input/output units (I/O units) including I/O unit 1 and I/O unit 2. I/O unit 1 includes one or more I/O controllers connected thereto, including I/O controller 222. I/O unit 2 includes I/O controllers 232 and 242 connected thereto. The I/O units include components to interface the I/O controllers to the fabric 202. Each I/O controller operates to control one or more I/O devices. For example, I/O controller 222 of I/O unit 1 is connected to I/O devices 223 and 224. For I/O unit 2, I/O controller 232 is connected to I/O device 233, while I/O controller 242 is connected to I/O device 243. The I/O devices may be any of several types of I/O devices, such as storage devices (e.g., a hard disk drive, tape drive) or other I/O device.

The hosts and I/O units (and their attached I/O controllers and devices) may be organized into groups known as clusters, with each cluster including one or more hosts and typically one or more I/O units (each I/O unit including one or more I/O controllers). The hosts and I/O units are interconnected via a cluster interconnection fabric 202. Cluster interconnection fabric 202 is a collection of routers, switches and communication links (such as wires, connectors, cables, etc.) that connects a set of nodes (e.g., connects a set of hosts and I/O units) of one or more clusters. As shown in the example network of FIG. 2, the example fabric 202 includes switches A, B and C, and links connected between the switches.

In addition, each I/O unit includes an I/O controller-fabric (IOC-fabric) adapter for interfacing between the fabric 202 and the I/O controllers. For example, IOC-fabric adapter 220 interfaces the controllers of I/O unit 1 to the fabric 202, while IOC-fabric adapter 230 interfaces the controllers of I/O unit 2 to the fabric 202.

The number and arrangement of hosts, I/O units, I/O controllers, I/O devices, switches and links illustrated in FIG. 2 is provided only as an example. A wide variety of implementations and arrangements are possible.

Figure 3:
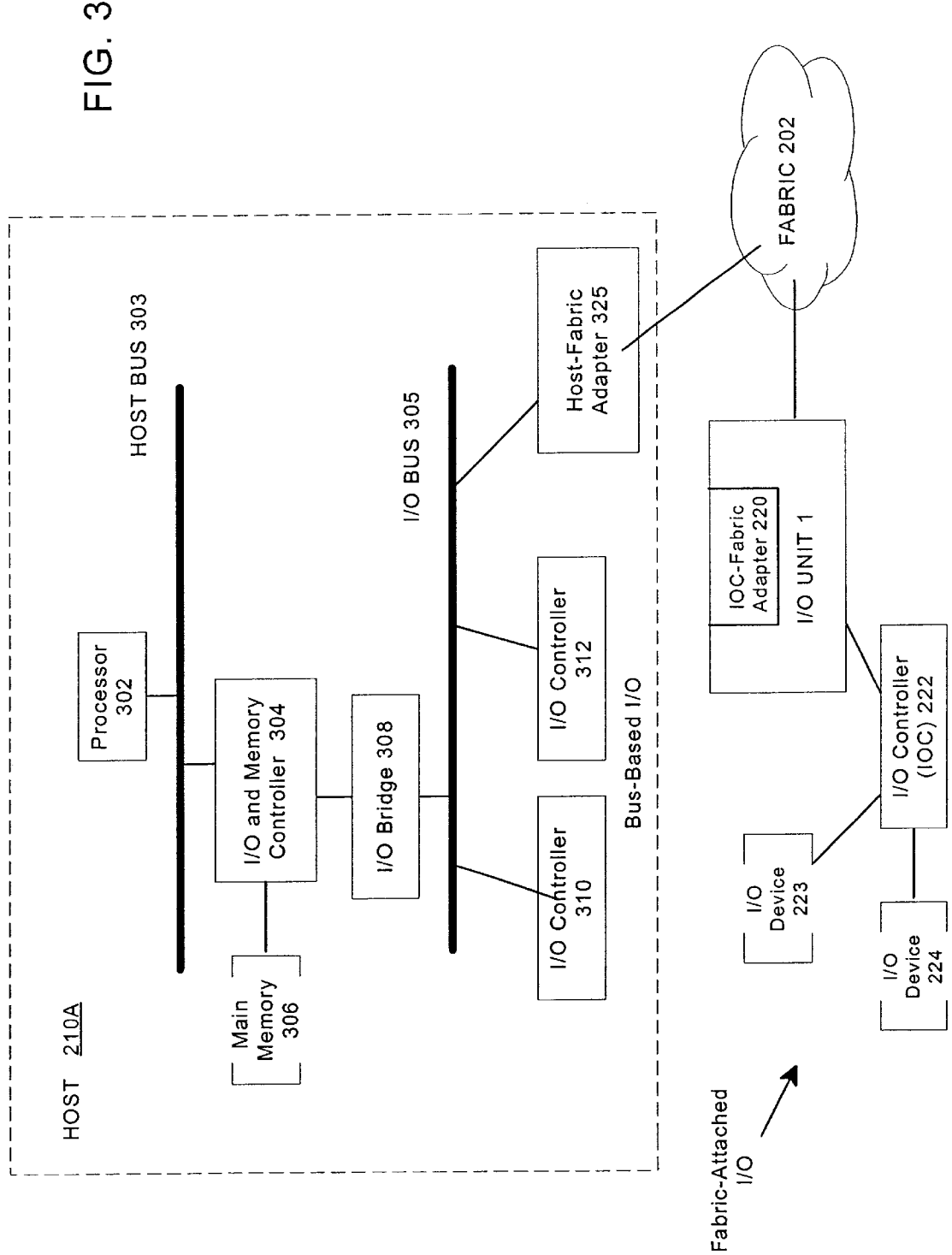
FIG. 3 is a block diagram of a host according to an example embodiment of the present invention.
Figure 4:
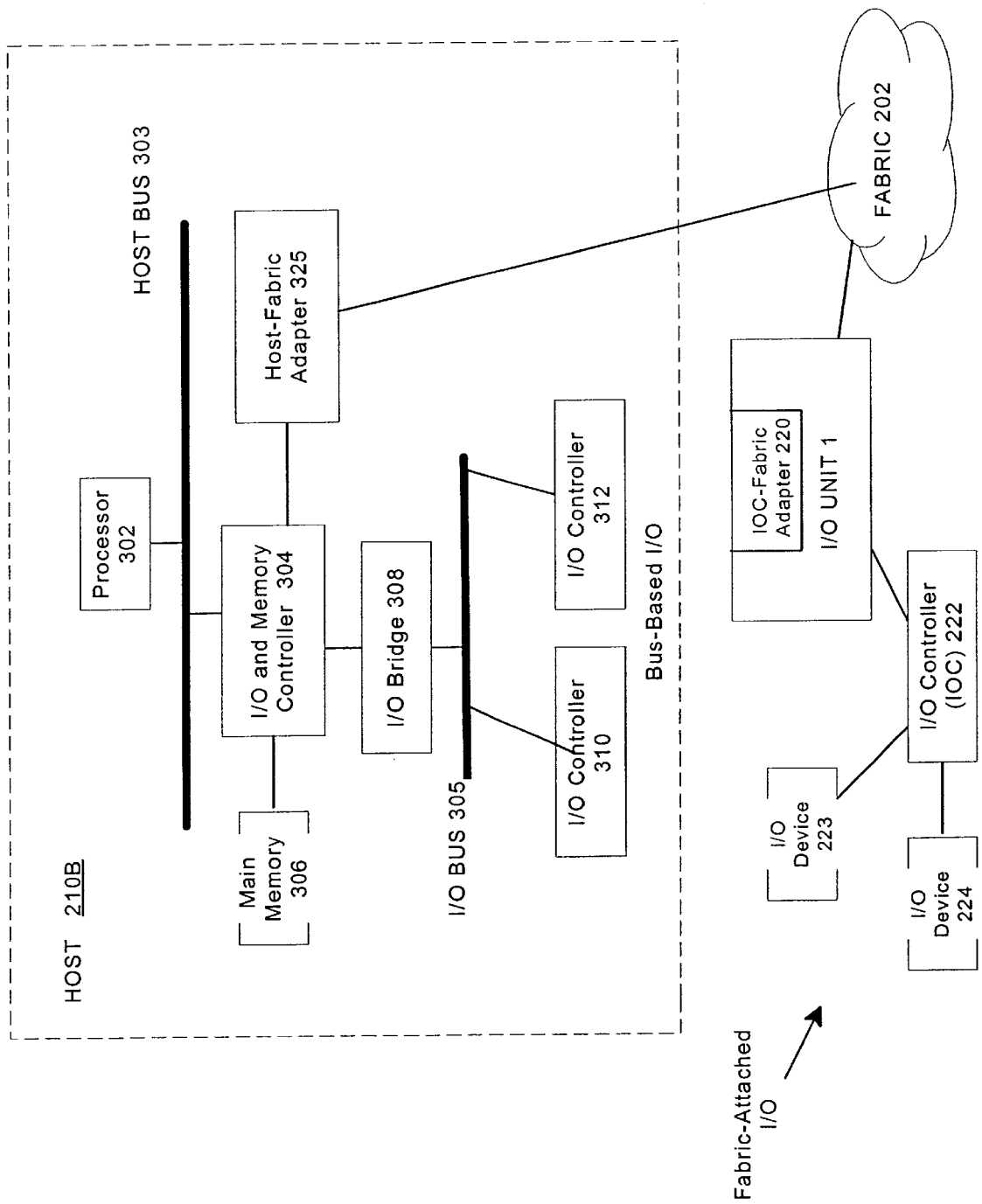
FIG. 4 is a block diagram of a host according to another example embodiment of the present invention.

Two embodiments of an example host (e.g., host 210) are illustrated in FIGS. 3 and 4. FIG. 3 is a block diagram of a host according to an example embodiment of the present invention. Referring to FIG. 3, a host 210A includes a processor 302 coupled to a host bus 303. An I/O and memory controller 304 (or chipset) is connected to the host bus 303. A main memory 306 is connected to the controller 304. An I/O bridge 308 operates to bridge or interface between the I/O and memory controller 304 and an I/O bus 305. Several I/O controllers are attached to I/O bus 305, including an I/O controllers 310 and 312. I/O controllers 310 and 312 (including any I/O devices connected thereto) are traditional bus-based I/O resources.

A host-fabric adapter 325 is also connected to the I/O bus 305. Host-fabric adapter 325 may be considered to be a type of a network interface card (e.g., usually including hardware and firmware) for interfacing the host 210A to cluster interconnection fabric 202. The host-fabric adapter 325 provides fabric communication capabilities for the host 210A. For example, the host-fabric adapter 325 converts data between a host format and a format that is compatible with the fabric 202. For data sent from the host 210, host-fabric adapter 325 formats the data into one or more packets, including a header. The host-fabric adapter 325 may provide reliability guarantees that the packets have reached the intended target or destination through a series of zero or more switches (in the fabric 202). In this embodiment shown in FIG. 3, the host-fabric adapter 325 is attached to a slot of I/O bus 305. I/O bus 305 may be any type of I/O bus, such as a PCI bus for example.

FIG. 4 is a block diagram of a host according to another example embodiment of the present invention. Referring to FIG. 4, a host 210B is illustrated and includes many of the same components as the host 210 of FIG. 3. Only the differences will be described. In FIG. 4, the host-fabric adapter 325 is connected directly to the chipset or I/O and memory controller 304, rather than being attached to an existing I/O bus. By connecting the host-fabric adapter 325 to the chipset or I/O memory controller, this can free or relieve the host-fabric adapter 325 of the limitations of the I/O bus 305. There are different ways in which the host-fabric adapter 325 can be connected to host 210. FIGS. 3 and 4 illustrate two examples of how this may be done.

According to one example embodiment or implementation, the components or units of the present invention are compatible with the Next Generation Input/Output (NGIO) Specification. Under such specification, the cluster interconnection fabric 202 is an NGIO fabric, the host-fabric adapter 325 is a Host Channel Adapter (HCA), and the IOC-fabric adapters are Target Channel Adapters (TCA). However, NGIO is merely one example embodiment or implementation of the present invention, and the invention is not limited thereto. Rather, the present invention is applicable to a wide variety of networks, hosts and I/O controllers.

As noted above, in traditional clusters the I/O controllers are not directly connected to the network or fabric, but are only attached as part of a host computer. However, according to an embodiment of the present invention (e.g., as shown in FIGS. 3 and 4), the I/O units and their I/O controllers are not connected to the fabric as a part of a host. Rather, the I/O units and I/O controllers are directly and separately connected to the cluster interconnection fabric 202 (and typically not as part of a host). For example, I/O unit 1 including controller 222 and I/O unit 2 including I/O controllers 232 and 242 are directly (or independently) connected to fabric 202. In other words, the I/O units (and their connected I/O controllers and I/O devices) are attached as separate and independent I/O resources to fabric 202 as shown in FIGS. 2–4, rather than as part of a host.

According to an embodiment, this provides a very flexible approach in which I/O units, I/O controllers (and I/O devices) connected to a cluster interconnection fabric can be assigned to one or more hosts in the cluster (rather than having a predetermined or fixed host assignment based upon being physically connected to the host's local I/O bus). The I/O units, I/O controllers and I/O devices which are attached to the cluster interconnection fabric 202 may be referred to as fabric-attached I/O resources (i.e., fabric-attached I/O units, fabric attached I/O controllers and fabric-attached I/O devices) because these are directly attached to the fabric 202 rather than being connected through (or as part of) a host.

In addition, according to an embodiment, the hosts in a cluster can detect and then directly address I/O units and I/O controllers (and attached I/O devices) which are directly attached to the cluster interconnection fabric 202 (i.e., the fabric-attached I/O controllers). However, a mechanism must be provided that allows a host to detect and address fabric-attached I/O controllers and devices, while preferably being compatible with many currently available operating systems.

A Fabric Bus Driver: Providing a Bus Abstraction to the OS for the Cluster Interconnection Fabric In many current operating systems, such as Windows 2000, all I/O controllers are assumed to be attached to an I/O bus. In Windows 2000, for example, there is separate kernel-mode software driver for each I/O bus, known as an I/O bus driver, which understands the specific characteristics, syntax, commands (or primitives), format, timing, etc. of that particular I/O bus. Under Windows 2000, all bus drivers provide an interface or translation between the host operating system and the I/O controllers connected to the I/O bus for detecting or identifying the I/O controllers which are connected to the I/O bus, and reporting the I/O controllers to the operating system.

The operating system kernel uses one standard set of primitives or commands and syntax for communicating with each I/O bus driver, for example, to identify or enumerate the I/O controllers connected to each I/O bus, to configure the connected I/O controllers on each I/O bus, and other control functions. For example, the I/O bus drivers assist the host operating system in managing dynamic addition and removal of I/O controllers on that bus if the underlying bus hardware supports its. In addition, the I/O bus drivers assist the operating system in power managing (e.g., powering down I/O devices during non-use) the I/O controllers on that bus if the underlying bus and I/O controllers support it.

To allow communication between the operating system kernel and each of several different I/O buses, each of the I/O bus drivers translates between the I/O specific primitives and syntax to a standard set of primitives and syntax used by the operating system. The operating system can invoke or call specific or well known or standard commands or entry points in the bus driver to query the capabilities of the I/O bus and the attached I/O controllers (e.g., to request a list of attached I/O controllers and devices and to configure the I/O controllers) and to power manage the I/O controllers.

Figure 5:
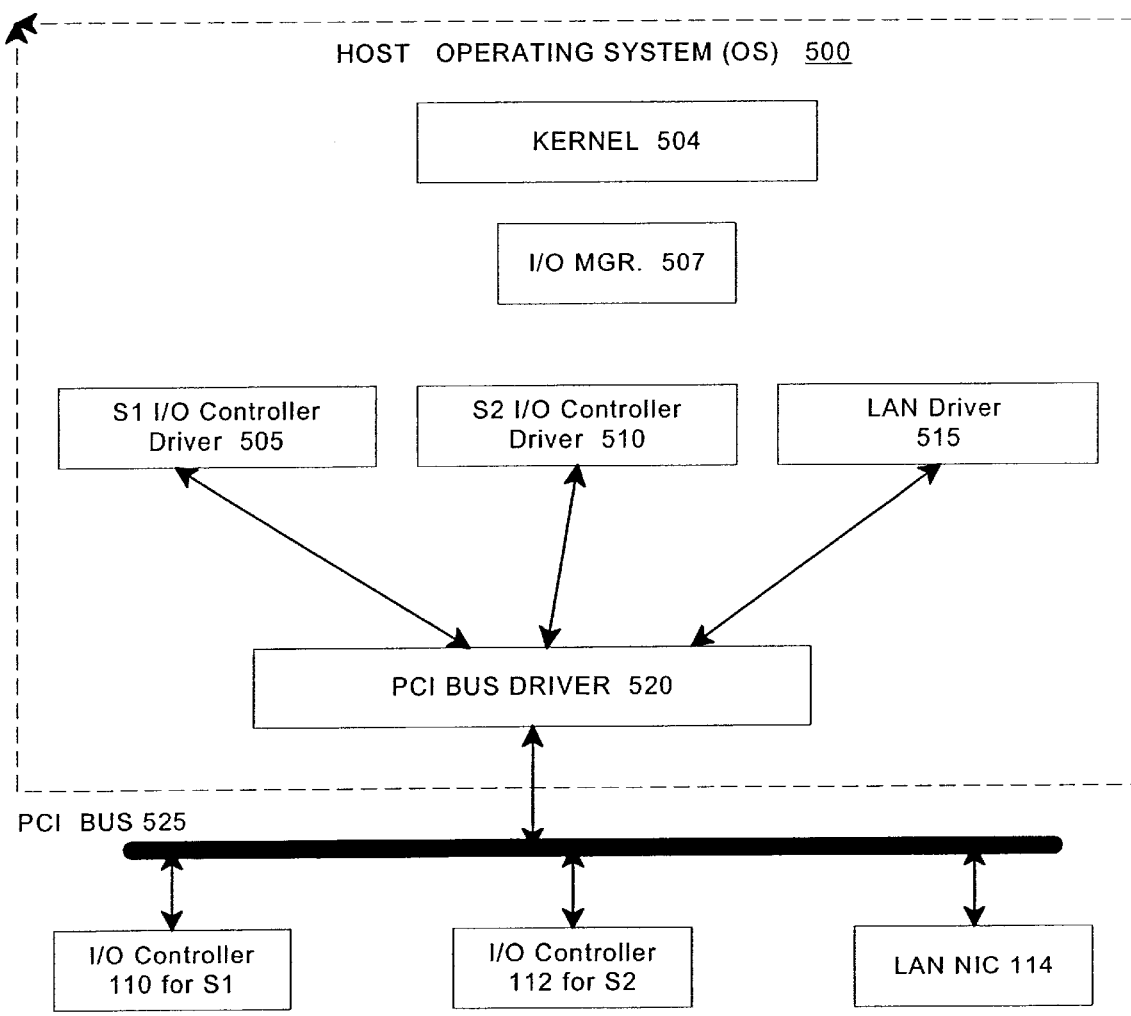
FIG. 5 is a block diagram illustrating an example software stack for a traditional computer having bus-based I/O.

FIG. 5 is a block diagram illustrating an example software stack for a traditional computer having bus-based I/O. A host operating system 500 is in communication with an I/O bus, such as a PCI bus 525 for example. Several I/O devices are attached to the slots of the PCI bus 525, including I/O controller 110 for a storage device S1, an I/O controller 112 for a storage device S2, and a LAN NIC 114.

The host operating system 500 includes a kernel 504 and an I/O manager 507 for managing the I/O buses and attached I/O resources (I/O controllers and devices). The operating system 500 also includes a PCI bus driver 520 (as an example I/O bus driver) which translates between the PCI specific primitives and syntax to a standard set of primitives and syntax used by the kernel 504 or I/O manager 507. The PCI bus driver 520 is provided for detecting or enumerating the I/O controllers and devices attached to the PCI bus 525, to configure the attached I/O controllers and devices, to inform the I/O manager 507 when controllers or devices have been added or removed, and for handling power management commands issued from the operating system to power manage the PCI controllers and devices (if power management is supported by those devices).

However, the PCI bus driver 520 is not aware of the different features and capabilities of the different I/O controllers. Therefore, operating system 500 includes an I/O controller driver (or function driver) for each I/O controller, including a S1 I/O controller driver 505 (for storage device S1 connected to I/O controller 110), an S2 I/O controller driver 510 (for storage device S2 connected to controller 112) and a LAN driver 515, as examples. Each I/O controller driver is provided for translating I/O requests (e.g., reads and writes to the I/O device) from a common or standard set of primitives and syntax used buy the host operating system to the primitives and syntax used by each I/O controller (e.g., after the I/O bus driver is used to identify and configure the I/O controller). Thus, an I/O controller driver is provided to handle reads and writes to the I/O devices connected to an I/O controller. There may typically be a different type of I/O controller driver for each type of I/O controller.

As noted above, a limitation with this current operating system and software driver stack is that all I/O controllers are assumed to be attached to a local I/O bus. The host can only detect and address I/O devices that are attached to the local I/O bus. In other words, even if one provides one or more fabric-attached I/O controllers, current operating systems do not allow a host to detect the presence or directly communicate with such fabric-attached I/O controllers and devices because all I/O controllers are presumed to be attached to a local I/O bus of the host, and current operating systems also do not support direct communication with a remote (or fabric-attached) I/O controller.

Figure 6:
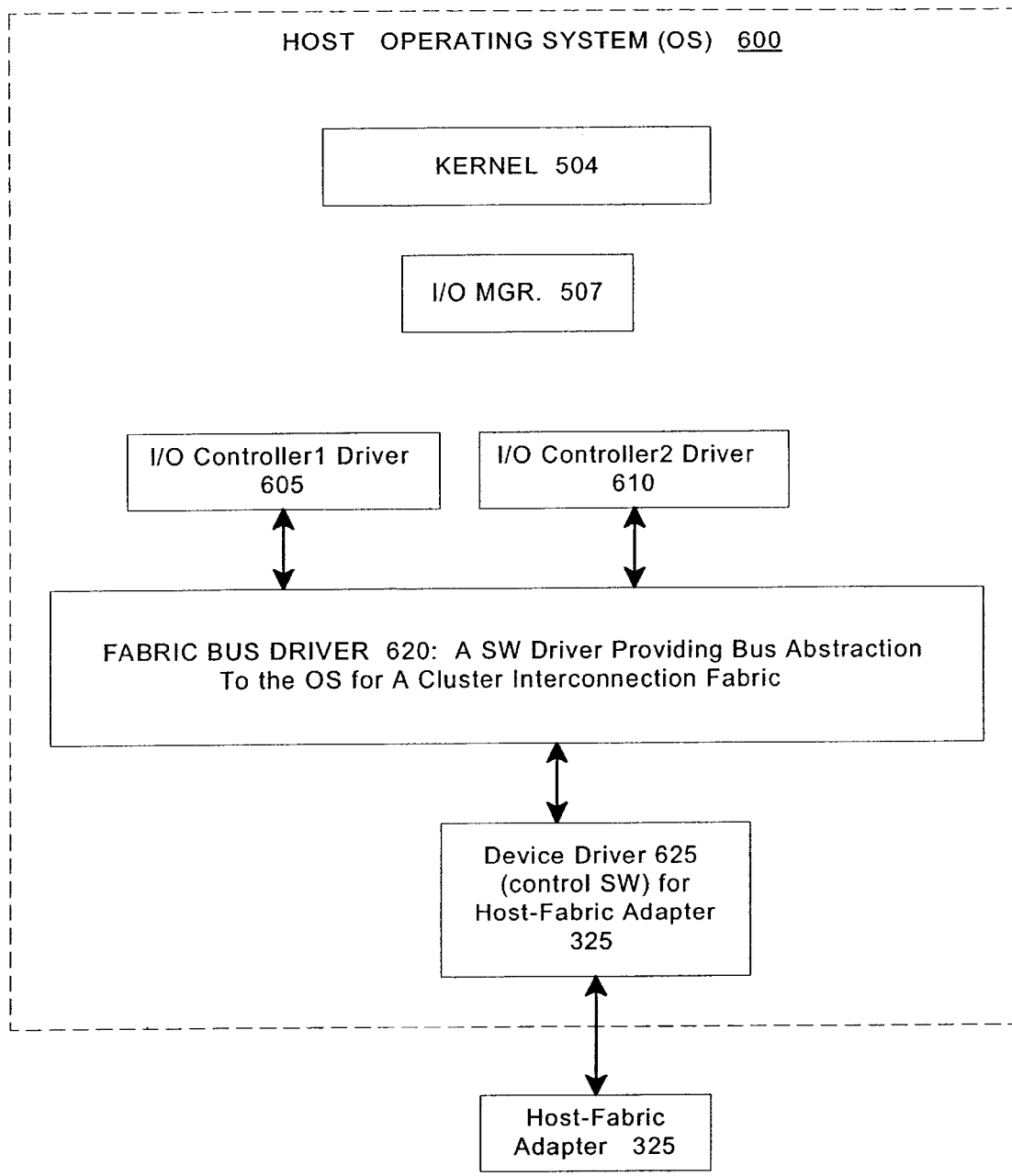
FIG. 6 is a block diagram illustrating a software driver stack for a computer having fabric-attached I/O resources according to an example embodiment of the present invention.

FIG. 6 is a block diagram illustrating a software driver stack for a computer having fabric-attached I/O resources according to an example embodiment of the present invention. Referring to FIG. 6, the host operating system 600 includes a kernel 504, an I/O manager 507, and a plurality of I/O controller drivers for interfacing to various I/O controllers, including I/O controller drivers 605 and 610. These components are the same as or similar to the currently available operating system illustrated in FIG. 5. According to an example embodiment, the host operating system 600 is Windows 2000, and the I/O manager 507 is a Plug-n-Play manager.

In addition, according to an embodiment of the invention, a fabric bus driver 620 (or pseudo bus driver) is provided for the cluster interconnection fabric 202. A traditional bus driver translates between the I/O bus specific primitives and syntax to a standard set of primitives and syntax used by the operating system. Likewise, the fabric bus driver 620 accepts the same set of standard operating system commands or primitives and syntax and translates them into fabric specific primitives, syntax and format, etc. The fabric bus driver 620 also provides the same set of services to the operating system as provided by other I/O bus drivers, and communicates with the kernel 504 or I/O manager 507 through the same common or standard set of primitives and syntax used by the operating system. Therefore, the fabric bus driver 620 abstracts or generalizes or presents the fabric 202 to the operating system 600 as a locally attached I/O bus, even though the cluster interconnection fabric 202 is not a bus and is not local. Thus, it can be said that the fabric bus driver 620 provides a bus abstraction to the operating system 600 (or to the I/O manager 507) for the cluster interconnection fabric 202. Thus, the fabric bus driver 620 may be thought of as a bus abstraction component.

A device driver 625 is provided for the host-fabric adapter 325. The device driver 625 controls the host-fabric adapter 325 (which is usually a card or hardware). The fabric bus driver 620 uses the communication services provided by the device driver 625 for the host-fabric adapter 325 to send and receive commands and information over the fabric 202. Thus, the host processor 302 can issue I/O requests (e.g., I/O reads, writes) to fabric-attached I/O controllers through the fabric bus driver 620, the device driver 625 and the host-fabric adapter 325. The host-fabric adapter 325 translates I/O requests between a host compatible format and a fabric compatible format. In this manner, the host processor 302 can communicate with fabric attached I/O controllers. The host processor 302 and the host operating system 600 do not have to be aware that the fabric-attached I/O controllers are not attached to a local I/O bus since the I/O bus abstraction and the host/fabric translations are transparent to the processor 302 and operating system 600.

Although the fabric 202 is not a "bus" in the traditional sense, it is also advantageous for the fabric bus driver 620 to provide a bus abstraction to the I/O manager 507 so that the fabric attached I/O controllers can participate in the overall Plug-n-Play procedures (e.g., dynamic addition and removal of I/O controllers) and power management functions implemented by the host operating system. In order to provide the bus abstraction, the fabric bus driver 620 (like the other bus drivers) communicates to the kernel 504 or I/O manager 507 using the standard set of primitives and syntax used and expected by the kernel and I/O manager 507 of operating system 600. The fabric bus driver 620 provides a standard set of services to the operating system 600 provided by bus drivers. Thus, the fabric bus driver 620 presents the cluster interconnection fabric 202 to the I/O manager 507 as a local I/O bus, and presents one or more fabric-attached I/O controllers as local (or bus-based) I/O controllers. In this manner, the operating system does not have to be aware that the I/O resource (or fabric) behind the fabric bus driver 620 is not a local bus, but rather is a cluster interconnection fabric 202 including one or more remote fabric attached I/O controllers. The existence of the cluster interconnection fabric 202 and the remote location of the fabric 202 and fabric-attached I/O controllers are preferably transparent to the host operating system 600. Thus, according to an embodiment, no changes are necessary in the kernel 504 or I/O manager 507 to allow the host 210 to identify and communicate with fabric-attached I/O controllers.

The operating system 600 (or the I/O manager 507 of OS 600) uses a standard set of primitives and syntax to query each I/O bus driver to identify the I/O controllers attached to the bus. In the same fashion, using these same standard set of primitives and syntax, the I/O manager 507 can query the fabric bus driver 620 to identify the fabric-attached I/O controllers that are assigned to the host (as if the fabric bus driver 620 was just another I/O bus driver). Many I/O controllers may be attached to the fabric 202. However, according to an embodiment of the invention, the fabric-attached I/O controllers (and their I/O devices) may be allocated or assigned to different hosts. According to one embodiment, each I/O controller can be assigned or allocated to only one host. Alternatively, an I/O controller can be assigned to multiple hosts (or shared among hosts). The fabric bus driver 620 then identifies the fabric-attached I/O controllers that are assigned to the host and reports this list of I/O controllers to the I/O manager 507 using the standard set of primitives and syntax used by other local I/O bus drivers to communicate with the I/O manager 507. Thus, the fabric bus driver 620 presents the fabric 202 as a local I/O bus to the operating system 600 (or to I/O manager 507) and presents the fabric-attached I/O controllers as local I/O controllers.

The fabric bus driver 620 can identify the list of fabric-attached I/O controllers assigned to the host in many different ways. A list of I/O controllers assigned to the host may be locally stored and accessed by the fabric bus driver 620, or the fabric bus driver 620 may query an external database or other host attached to the fabric 202 to obtain the list of I/O controllers assigned to this particular host, as examples.

Figure 7:
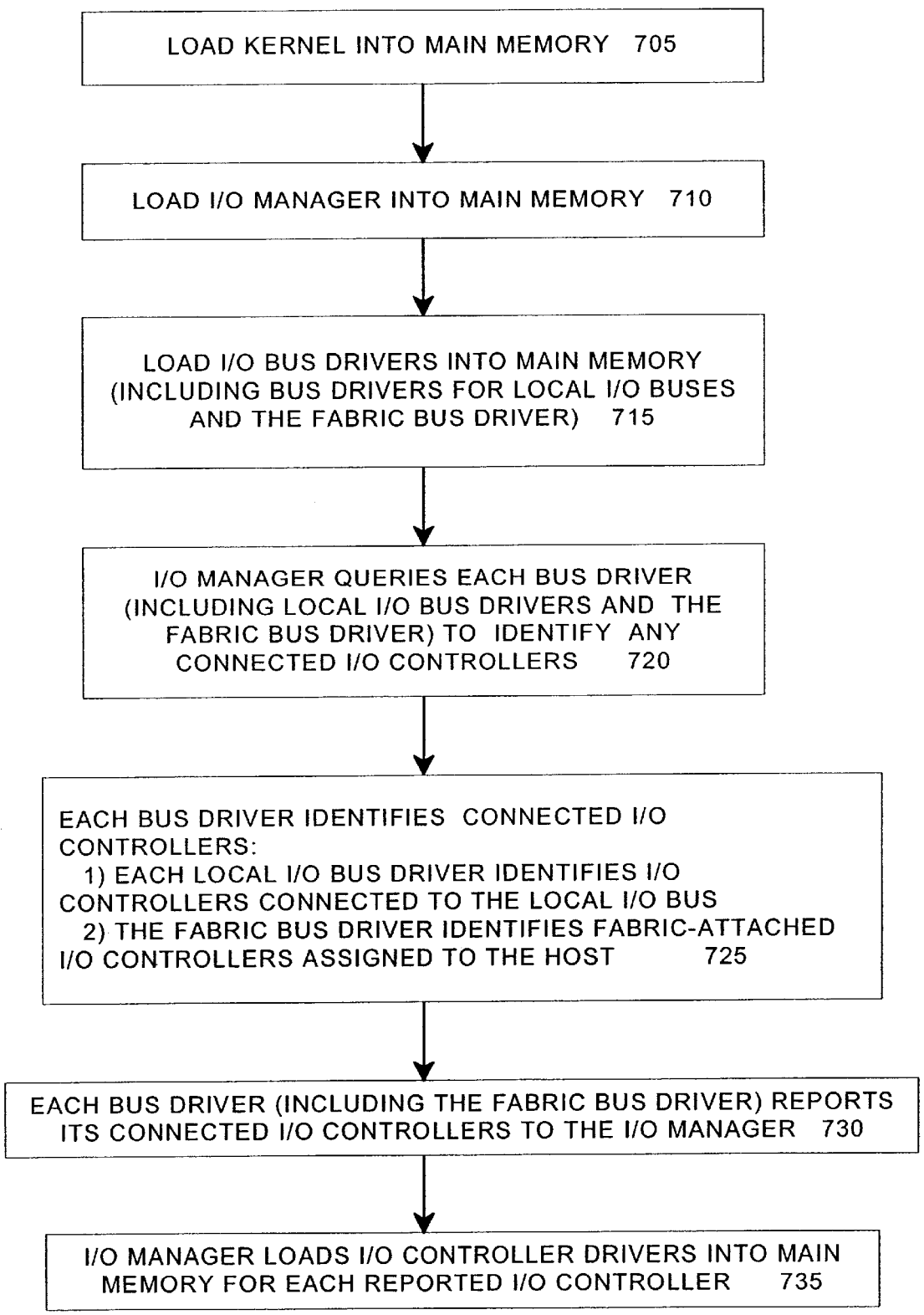
FIG. 7 is a flow chart identifying the steps performed by a host during host initialization according to an example embodiment of the present invention.

FIG. 7 is a flow chart identifying the steps performed by a host during host initialization according to an example embodiment of the present invention. At block 705, kernel 504 is loaded into main memory (e.g., at power-on with the assistance of the execution of the Basic Input Output System or BIOS). The Kernel 504 then executes to perform several other tasks or functions for initialization. At block 710, the I/O manager 507 is loaded into main memory and executed.

At block 715, each of the I/O bus drivers are loaded into main memory and executed. These "I/O bus drivers" loaded into main memory include the I/O bus drivers for the local I/O buses (e.g., a PCI bus driver) and the fabric bus driver 620. As noted above, the fabric bus driver 620 is presented to the operating system 600 as a local I/O bus driver.

At block 720, the I/O manager 507 queries (or requests) each bus driver (including the fabric bus driver 620) to identify any connected I/O controllers.

At block 725, each "bus driver" identifies each connected I/O controller. The local I/O bus drivers identify each I/O controller connected to the corresponding local I/O buses. Similarly, the fabric bus driver 620 identifies each fabric-attached I/O controller which is assigned to the host.

At block 730, each I/O bus driver (including the fabric bus driver 620) reports to the I/O manager 507 a list of the connected I/O controllers as requested.

At block 735, the I/O manager 507 loads an I/O controller driver (specific to each type of I/O controller) into main memory for each type of I/O controller reported to the I/O manager 507. This allows the processor 302 to communicate with each reported I/O controller to issue I/O requests (e.g., reads and writes) to one or more I/O devices connected to the I/O controller, etc. According to an embodiment, where there are several I/O controllers of one type, an instance of the corresponding I/O controller driver may be loaded into main memory for each instance of the I/O controller.

Assigning I/O Controllers to Hosts

A cluster includes one or more hosts and one or more I/O units (each including one or more I/O controllers) connected together by a common cluster interconnection fabric. According to an embodiment of the present invention, the fabric-attached I/O units and fabric-attached I/O controllers are visible or detectable to all hosts (or to at least multiple hosts) in the cluster that are in the same cluster membership (i.e., which are a part of the same cluster). Also, according to an embodiment, the cluster interconnection fabric appears as a large I/O "bus" that runs or extends through all (or at least multiple) hosts in the cluster. This differs from the typical host model in which I/O controllers are physically attached to a single host through one or more local I/O buses and are visible or detectable only to that single host (i.e., a traditional I/O bus does not span multiple hosts). With such an arrangement, a mechanism is needed by which hosts can determine which I/O controllers they are allowed to access so that all do not attempt to use all I/O controllers that are visible or detectable to them. An ownership conflict or data conflict could arise if two hosts are using (i.e., reading and writing to) the same I/O controller, but are unaware that another host is using the I/O controller.

Figure 8:
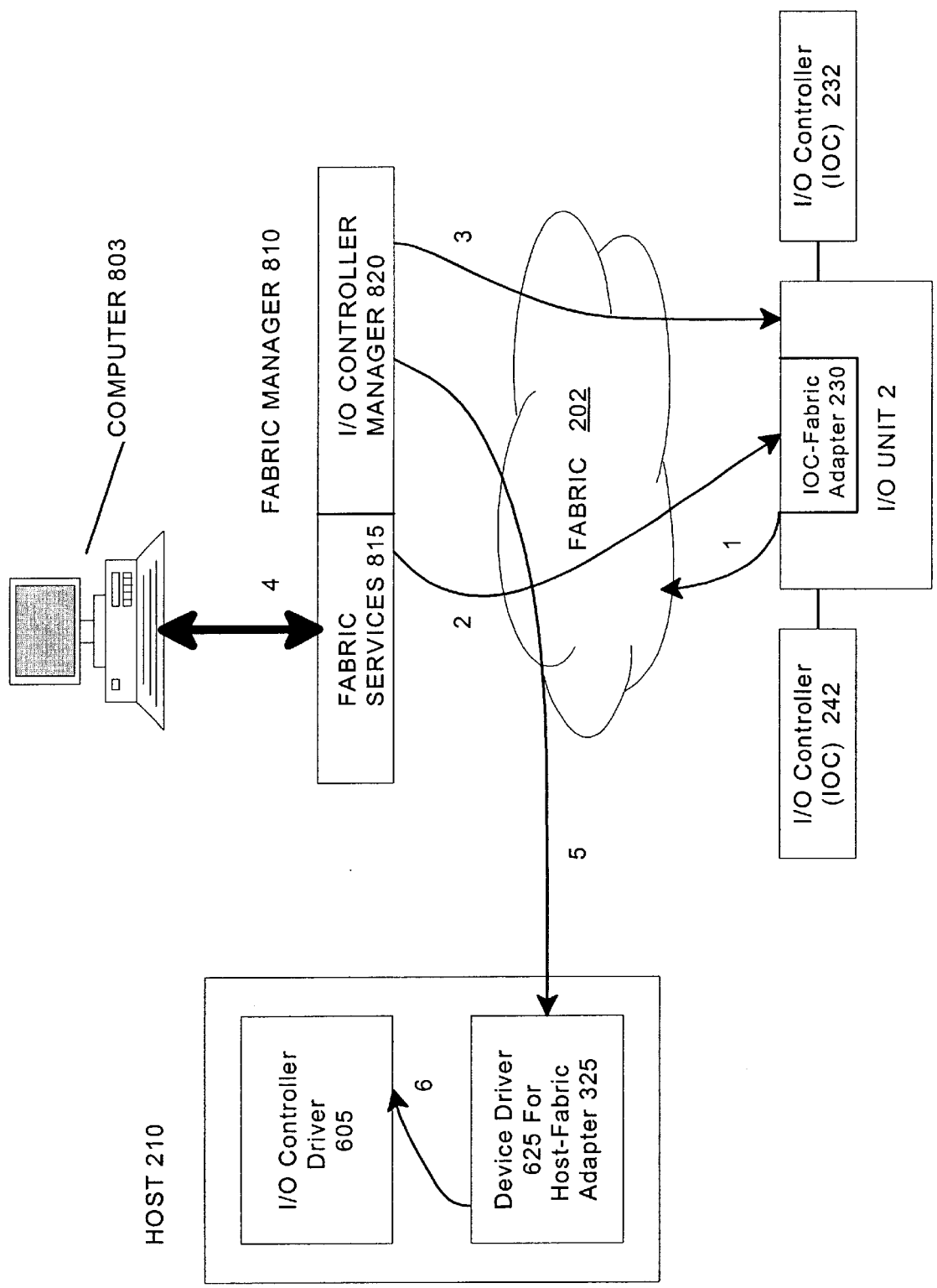
FIG. 8 is a block diagram of a network including a fabric manager according to an example embodiment or the present invention.

FIG. 8 is a block diagram of a network including a fabric manager according to an example embodiment or the present invention. The network includes an example cluster, including a host 210 and an I/O unit 2 which includes connected I/O controllers 232 and 242. The host 210 and the I/O unit are coupled via a cluster interconnection fabric 202. Although a cluster can include multiple hosts and multiple I/O units, only one host (host 210) and one I/O unit (I/O unit 230) are illustrated in this example cluster.

The network in FIG. 8 also includes a fabric manager 805 for managing the cluster interconnection fabric and a human administrator 802 which may control certain aspects of the network using a computer 803. The fabric manager 810 includes a fabric services 815 for performing several administrative functions or services for the fabric or network, and an I/O controller manager 820 for controlling the fabric-attached I/O controllers in the network.

Fabric services 815 (of fabric manager 810) is responsible for detecting I/O units attached to the fabric 202 and then assigning them a network address (such as a Medium Access Control or MAC address). According to an embodiment, each different port of an I/O unit is assigned a unique MAC address, and each I/O controller being connected to a different port of the I/O unit. Thus, under such an embodiment, the hosts can address the I/O controllers using the MAC address of their connected I/O unit and the port number identifying the port on I/O unit where the I/O controller is attached (for example). According to another embodiment of the invention, the fabric services 815 can assign a different network address or MAC address to each I/O controller. Fabric services also initializes the I/O unit, which may include transitioning the ports to an active state.

Once the I/O unit has been initialized and has been assigned a MAC address, the I/O controller manager 820 enumerates or identifies the I/O controllers connected to the I/O unit. The I/O controller manager 820 can identify the I/O controllers attached to each I/O unit by sending a query (or query message) to each I/O unit (or to the new I/O unit), and with each I/O unit responding with a list of I/O controllers identifying the type of controller, the port number which the controller is attached, etc. The response from the I/O unit to the I/O controller manager 820 may also include an identification and type of each I/O device connected to each I/O controller.

After enumerating or identifying the I/O controllers for each I/O unit, the I/O controller manager 820 then decides which hosts are allowed to access each of the fabric-attached I/O controllers (e.g., assigns I/O controllers to hosts). This decision can be made with input from one or more sources. For example, a database that stores persistent associations between controllers and hosts can be used, a human administrator assigning I/O controllers to hosts or by using some other mechanism. A human administrator 802 making the I/O controller assignment decisions can input the decisions on a computer 803 which may be attached to the fabric 202 (either within the cluster or in another cluster), or may be remotely located from the network.

After the I/O controller assignment decision is made for each I/O controller (e.g., after the I/O controllers have been assigned to hosts), the I/O controller manager 820 sends a message to the affected hosts (i.e., sends a message to each host that will have access to a fabric-attached I/O controller). If sharing is desired, the I/O controller manager 820 reports the I/O controller to more than one host, and may indicate that the I/O controller is shared among multiple hosts. If sharing is not desired for an I/O controller, the I/O controller manager 820 reports the I/O controller to a single host attached to the fabric 202 and may indicate that the access to the I/O controller is exclusive.

Figure 9:
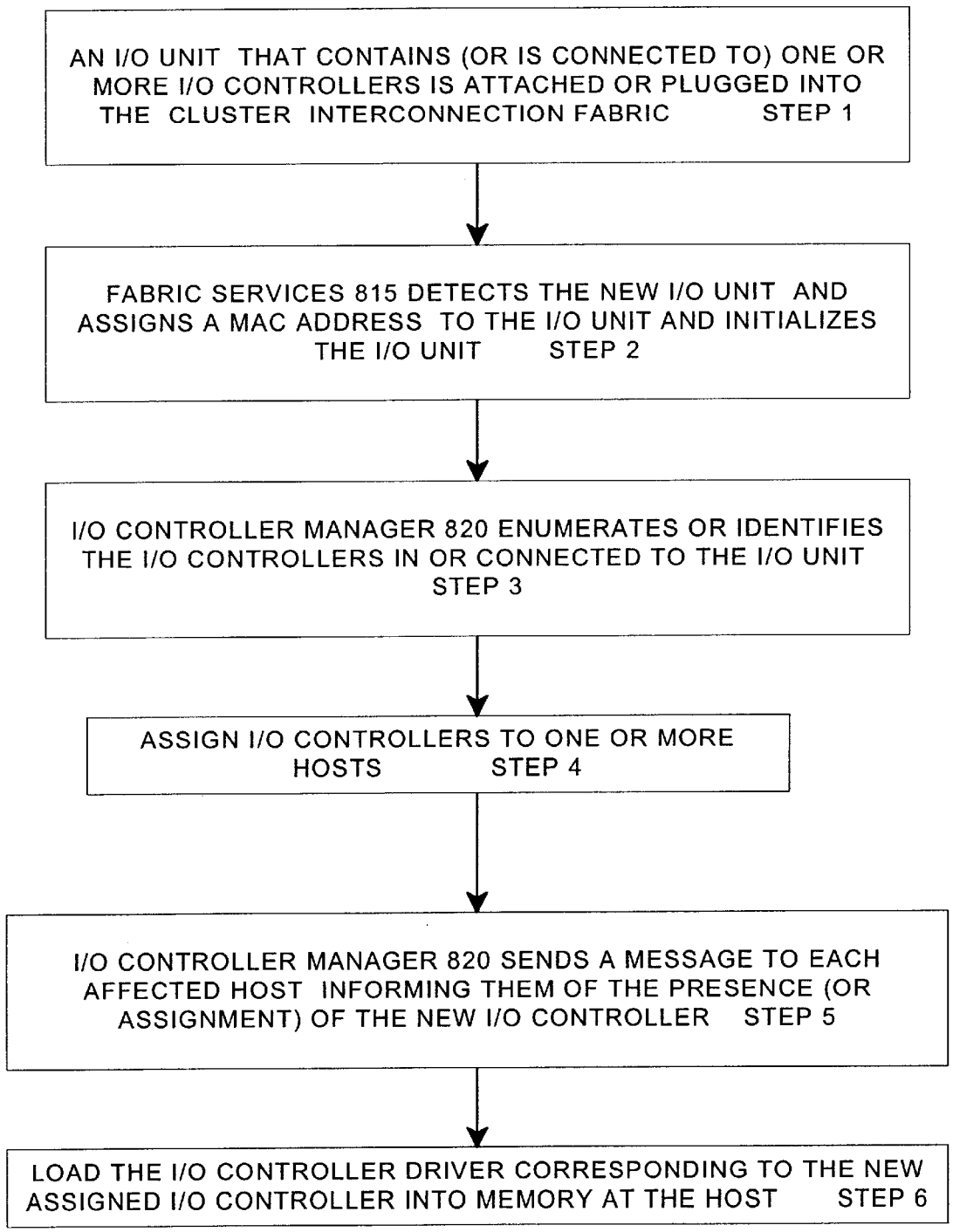
FIG. 9 is a flow chart illustrating the steps performed when an I/O controller is connected or attached to the cluster interconnection fabric according to an embodiment of the present invention.

FIG. 9 is a flow chart illustrating the steps performed when an I/O controller is connected or attached (i.e., plugged in) to the cluster interconnection fabric. The steps 1–6 described in the flow chart of FIG. 9 are also illustrated by arrows in FIG. 8. Steps 2, 3 and 5 include sending messages over the fabric 202. As a result, the arrows in FIG. 9 for these steps are therefore shown as passing through the fabric 202.

At step 1 of FIG. 9, an I/O unit (including one or more connected I/O controllers) are connected or attached to the cluster interconnection fabric 202.

At step 2 of FIG. 9, fabric services 815 detects the new I/O unit attached to the fabric 202. This can be done in several different ways, including using a fabric trap mechanism or during the next sweep of the fabric 202 by the fabric services 815, as examples. In an example trap mechanism, the switch connected to a new I/O unit sends a message to the fabric manager 810 to indicate that a change has occurred (e.g., the I/O unit has been added to the fabric). A message would also be sent from an existing I/O unit to fabric manager 810 when an I/O controller is added or removed. The fabric manager 810 may then send a message to the I/O unit to enumerate or identify the I/O controllers connected to the new I/O unit (including the new I/O controller). The fabric manager 810 may periodically sweep the fabric by sending out messages to all I/O units and hosts connected to the fabric requesting that each I/O unit or host reply with a message indicating their presence or connection to the fabric. The fabric manager could then send messages to enumerate the I/O controllers connected to each I/O unit.

After detecting the new I/O unit attached to the fabric, fabric services 815 then assigns a MAC or network address to the new I/O unit and initializes the I/O unit. Initialization may include setting ports of the I/O unit to an active state. According to an embodiment, a MAC or network address is assigned to each I/O unit port. One or more I/O controllers can be reached through an I/O unit port.

At step 3 of FIG. 9, the I/O controller manager 820 enumerates or identifies the I/O controllers connected to the I/O unit or contained in the I/O unit. A standard technique can be used to identify the I/O controllers connected to each I/O unit. For example, the I/O controller manager 820 may query each I/O unit to obtain the I/O unit profile identifying each I/O controller connected to the I/O unit.

At step 4 of FIG. 9, the new I/O controller is assigned to one or more hosts in the cluster (i.e., to one or more hosts connected to the cluster interconnection fabric 202). According to an embodiment of the invention, the I/O controller manager 820 assigns controllers to one or more hosts by: a) looking up the I/O controllers or I/O units in a database lookup table to identify or match the corresponding host(s); or, b) consulting a default policy for I/O controller assignment; or c) consulting a human administrator 802. Assigning I/O controllers to hosts using a database lookup method allows an administrator to store persistent (e.g., permanent or semi-permanent) mappings or correspondence between I/O units or I/O controllers and hosts and allows this I/O controller assignment to occur quickly and automatically without human intervention. If a human administrator is consulted, the human administrator may be located within the network or cluster, or may be remotely located from the cluster or cluster interconnection fabric 202 (i.e., not directly connected to the cluster interconnection fabric 202).

At step 5 of FIG. 9, the I/O controller manager 820 sends a message to the host-fabric adapter 325 of the host which the new I/O controller has been assigned. This message to the host informs the host of the presence of the new I/O controller, and will (explicitly or implicitly) provide authorization for the host to access the new I/O controller. In the event that an I/O controller has been removed from the cluster or fabric or has been reassigned to another host, a similar message will be sent to the host (the previous owner) indicating that the I/O controller is not available or is no longer assigned to the host. This allows the administrator 802 and/or the I/O controller manager 820 to dynamically add, remove or reassign I/O controllers in the cluster and quickly inform the affected hosts of this change in the assignment or ownership of the I/O controllers.

According to an embodiment, the host-fabric adapter 325 has its own unique network address or MAC address. Thus, the I/O controller manager 820 (or the fabric manager 810) can thus send messages to a host that is connected to the fabric 202 by sending a message or packet to the address of the host's host-fabric adapter 325. The device driver (or control software) 625 for the host-fabric adapter 325 at the host receives the message from the I/O controller manager 820. The message from the I/O controller manager 820 reports the new I/O controller to the host (e.g., implicitly assigning the new controller to the host), and includes enough information to allow the host to use or access the I/O controller and the connected I/O devices.

For example, the message from the I/O controller manager 820 will typically provide the network address or MAC address of the I/O unit, or the network address of the IOC-fabric adapter for the I/O unit. Each IOC-fabric adapter will typically include a unique network or MAC address (e.g., the network address of the IOC-fabric adapter 230 for I/O unit 2). This network address, in effect, is the address of the I/O unit, and provides the address where the I/O controllers and I/O devices for the I/O unit can be accessed (according to one embodiment of the invention). As an example message or report from the I/O controller manager 820 to host 210, the message could include information that identifies the address of the I/O unit, and information identifying the I/O controllers connected to the I/O unit which may be accessed or used by the host 210. This information may, for example, indicate that there are two I/O controllers connected to the I/O unit (including I/O controllers 242 and 232) and identify the type of each controller. The message will also typically identify whether the I/O controller is exclusively assigned to (or owned by) host 210, or whether the I/O controller is shared among multiple hosts. Using this identification information, the host 210 will be able to access the new fabric-attached I/O controller (e.g., read or write to the I/O controllers and I/O devices).

At step 6 of FIG. 9, the device driver 625 on the host causes the host operating system to load the I/O controller specific driver 605 for the new I/O controller into main memory of the host 210.

I/O controller manager 820 is shown in FIG. 8 as being a part of the fabric manager 810. Alternatively, if centralized administration is suitable or desirable for the cluster, the I/O controller manager 820 can be implemented as a software agent running on one of the hosts in the cluster. If centralized administration is not desirable (or if a distributed administration is desired), the I/O controller manager 820 can be provided as a distributed set of software agents residing on several hosts in the cluster or attached to the cluster interconnection fabric 202. Under either arrangement, not all hosts are required to participate in the administrative function of assigning fabric-attached I/O controllers to hosts.

Therefore, according to an embodiment of the invention, a centralized technique is provided for assigning I/O controllers to hosts in a cluster. The present invention allows I/O controllers to be dynamically added, removed or reassigned to a new host. If a new I/O controller is connected or attached to the cluster interconnection fabric, the I/O controller manager 820 assigns the new I/O controller to one or more hosts. This assignment decision can be made with input from one or more sources including a database or lookup table, based upon input from a human administrator or using some other mechanism. The I/O controller 820 then sends a message to each affected host informing the host of the new I/O controller that has been assigned to it. In the event that an I/O controller has been removed or reassigned, the I/O controller will send messages to the affected host or hosts informing them that the I/O controller is no longer assigned to the host (or is unavailable).

An advantage of the centralized technique of the present invention is that the technique or mechanism does not require the involvement of all hosts in the cluster or network to decide controller assignment. This technique also saves network bandwidth if there are a large number of hosts in the cluster and many I/O controllers being added or removed to the fabric because a central agent (e.g., the I/O controller manager 820) assigns or reassigns the I/O controllers. In addition, network bandwidth is also saved because messages are sent regarding the new controller assignments only to the affected hosts. A more distributed approach which that requires all (or many) hosts in the network to communicate with each other to negotiate controller assignments may use a non-negligible percentage of the available cluster or network bandwidth. The centralized controller assignment of the present invention reduces the complexity of the software or code necessary to implement the assignment process. Much more complicated algorithms would be necessary if all or many hosts were required to negotiate the I/O controller assignments. Detection and recovery from failures of individual hosts is also simpler using a centralized administrative agent. In addition, the centralized technique of the present invention is faster than the use of a distributed mechanism, and also allows the administrator or administrative agent (such as the I/O controller manager 820) to be located or hosted on a separate system or network. Thus, one administrative agent can remotely manage multiple clusters at the same time.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, while the present invention has been described with reference to a network, the various aspects of the present invention are applicable to a wide variety of networks, including system area networks, storage area networks, Local Area Networks (LANs), Wide Area Networks (WANs), the Internet, etc.

What is claimed is:

1. A method of assigning an I/O controller to a host in a cluster, the cluster including one or more hosts and one or more I/O controllers connected by a cluster interconnection fabric, the method comprising the steps of:

connecting an I/O controller to the cluster interconnection fabric;

detecting the I/O controller connected to the fabric;

assigning a network address to the I/O controller;

using an administrative agent to assign the I/O controller to a host that is connected to the cluster interconnection fabric;

sending a message to the host informing the host that the I/O controller is assigned to the host and providing the network address of the I/O controller.

2. The method as claimed claim 1, wherein the I/O controller connected to the cluster interconnection fabric is detected using one of the following techniques:

using an interrupt mechanism; and by sweeping the cluster interconnection fabric.

3. The method as claimed claim 1, wherein the administrative agent used to assign the I/O controller comprises assigning the I/O controller to a host by matching the I/O controller to a host using a database.

4. The method as claimed claim 1, wherein the administrative agent used to assign the I/O controller comprises assigning the I/O controller to a host based upon an assignment or information received from a human administrator.

5. The method as claimed claim 1, further comprising:

sending a message to the host informing the host that the I/O controller is assigned to the host and providing the network address of the I/O controller, the message also identifying a type of controller for the I/O controller.

6. The method as claimed in claim 1, wherein the cluster interconnection fabric appears as an I/O bus to the host.

7. A method of reassigning an I/O controller to a host in a cluster, the cluster including a plurality of hosts and one or more I/O units connected by a cluster interconnection fabric, the method comprising the steps of:

reassigning an I/O unit from an old host to a new host, the old host and new host being connected to the cluster interconnection fabric;

sending a message from an administrative agent to the old host indicating that the I/O unit is no longer assigned to the old host;

sending a message from the administrative agent to the new host indicating that the I/O unit is assigned to the new host, and providing a network address of the I/O unit.

8. The method as claimed in claim 7, wherein the cluster interconnection fabric appears to the old host and the new host as an I/O bus.

9. The method as claimed in claim 7, wherein the messages sent to the hosts are transmitted from the administrative agent to the hosts over the cluster interconnection fabric.

10. A method of assigning an I/O unit to a host in a cluster, the cluster including one or more hosts and one or more I/O units connected by a cluster interconnection fabric, the method comprising the steps of:

connecting a new I/O unit to the cluster interconnection fabric, the new I/O unit including a new I/O controller connected thereto;

detecting the new I/O unit connected to the cluster interconnection fabric;

querying the new I/O unit to identify any I/O controllers connected to the I/O unit;

assigning the I/O controller connected to the I/O unit to a host; and sending a message to the host informing the host that the new I/O controller is assigned to the host and providing the network address of the new I/O unit where the new I/O controller can be reached.

11. The method as claimed in claim 10, further comprising the step of the host loading an I/O controller driver into memory corresponding to the new I/O controller assigned to the host.

12. The method as claimed in claim 10, wherein the cluster interconnection fabric appears to the host as an I/O bus.

13. A cluster comprising:

a cluster interconnection fabric;

one or more hosts connected to the cluster interconnection fabric;

an I/O controller connected to the cluster interconnection fabric;

a fabric manager connected to the cluster interconnection fabric, to assign the I/O controller in the cluster to one or more hosts to send messages to the one or more hosts indicating that the I/O controller has been assigned to the one or more hosts.

14. The cluster as claimed in claim 13, wherein the fabric manager includes:

a fabric services to detect the connection or presence of the I/O controller and to assign a network address to the I/O controller; and an I/O controller manager coupled to the fabric services to assign the I/O controller to one or more hosts and to send messages to affected hosts informing the affected hosts that the I/O controller has been assigned to the affected hosts and identifying the network address of the I/O controller.

15. The cluster as claimed in claim 13, wherein the cluster interconnection fabric appears to each of the hosts in the cluster as an I/O bus.

16. The cluster as claimed in claim 13, wherein the one or more hosts each comprises:

a processor;

a memory coupled to the processor; and a host-fabric adapter coupled to the processor to interface the host to the cluster interconnection fabric.

17. The cluster as claimed in claim 16, wherein the one or more hosts each further comprises an operating system including a kernel, a device driver for the host-fabric adapter and an I/O controller driver that is specific to the assigned I/O controller.

18. The cluster as claimed in claim 17, wherein the operating system further comprises a fabric bus driver to provide a bus abstraction for the cluster interconnection fabric.

19. A network comprising:

a cluster interconnection fabric;

one or more hosts connected to the cluster interconnection fabric;

an I/O unit connected to the cluster interconnection fabric;

one or more I/O controllers connected to the I/O unit; and a fabric manager connected to the cluster interconnection fabric, to assign I/O controllers in the cluster to one or more hosts and to send messages to the one or more hosts indicating that each I/O controller has been assigned to the one or more hosts.

* * * * *